(12) United States Patent
Schumacher et al.

(10) Patent No.: US 7,455,352 B2
(45) Date of Patent: Nov. 25, 2008

(54) LOCKING DEVICE FOR LOCKING MOVABLE VEHICLE ROOF TO VEHICLE ROOF RECEPTACLE

(75) Inventors: Thorsten Schumacher, Kummerfeld (DE); Marcus Papendorf, Besigheim (DE); Michael Neuberger, Öhringen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 143 days.

(21) Appl. No.: 11/534,031

(22) Filed: Sep. 21, 2006

(65) Prior Publication Data

US 2007/0069552 A1    Mar. 29, 2007

(30) Foreign Application Priority Data

Sep. 23, 2005    (DE) .................. 10 2005 045 740

(51) Int. Cl.
*B60J 7/19* (2006.01)
(52) U.S. Cl. ....................................................... 296/224
(58) Field of Classification Search ............ 296/220.01, 296/224
See application file for complete search history.

(56) References Cited

U.S. PATENT DOCUMENTS

| | | | | |
|---|---|---|---|---|
| 3,536,354 A | | 10/1970 | Ingram | |
| 4,678,228 A | * | 7/1987 | Boots | 296/216.03 |
| 5,269,586 A | * | 12/1993 | Hahn et al. | 296/224 |
| 6,419,310 B1 | * | 7/2002 | Manders | 296/223 |
| 6,631,945 B2 | * | 10/2003 | Schleicher et al. | 296/221 |
| 6,913,307 B2 | | 7/2005 | Hesse | |
| 2005/0173947 A1 | | 8/2005 | Grimm et al. | |

FOREIGN PATENT DOCUMENTS

| | | |
|---|---|---|
| DE | 20 2004 001 916 U1 | 4/2004 |
| DE | 102 54 774 A1 | 6/2004 |
| EP | 1 331 120 A1 | 7/2003 |

* cited by examiner

*Primary Examiner*—Dennis H Pedder
(74) *Attorney, Agent, or Firm*—Brooks Kushman P.C.

(57) ABSTRACT

A locking device for locking a movable vehicle roof to a vehicle roof receptacle includes a locking rail. The locking rail is supported on a side of one of the roof receptacle and the roof. The locking rail is longitudinally displaceable and executes a lifting movement in response to being longitudinally displaced. A first locking element is supported on the locking rail. A second locking element is supported on a side of the other one of the roof receptacle and the roof. The first and second locking elements lock against one another in response to the lifting movement of the locking rail such that the roof receptacle and the roof are tensioned toward one another.

4 Claims, 4 Drawing Sheets

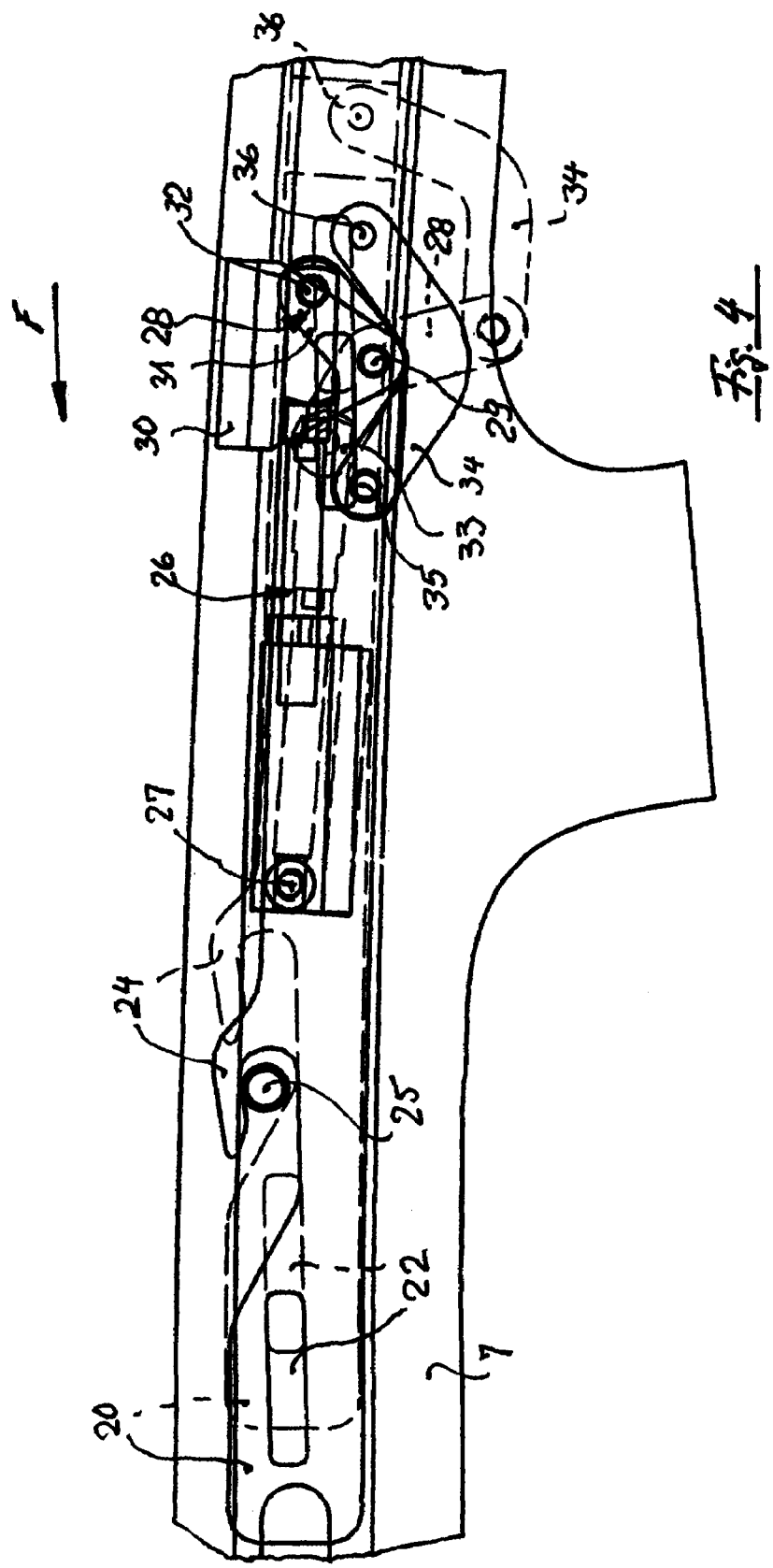

LOCKING DEVICE FOR LOCKING MOVABLE VEHICLE ROOF TO VEHICLE ROOF RECEPTACLE

CROSS-REFERENCE TO RELATED APPLICATIONS

This application claims foreign priority benefits under 35 U.S.C. § 119(a)-(d) to DE 10 2005 045 740.1, filed Sep. 23, 2005, which is hereby incorporated by reference in its entirety.

BACKGROUND OF THE INVENTION

1. Field of the Invention

The present invention relates to a locking device for locking a movable vehicle roof to a vehicle roof receptacle.

2. Background Art

In various applications, a locking device between a movable cover and a receptacle is used to lock the cover to the receptacle. For example, a motor vehicle having an open body includes a roof receptacle and a vehicle roof which is movable relative to the receptacle. The receptacle lies at the height of the vehicle roof plane and surrounds a roof cutout of the vehicle. The roof is movable between a closed position in which the roof lies within the receptacle to thereby cover the vehicle interior and an opened position in which the roof is removed from the receptacle to thereby expose the vehicle interior. The roof moves along the vehicle's longitudinal axis (e.g., in a direction between the front and rear vehicle ends) when moving between the closed and opened positions. The receptacle includes a side edge at each of the two vehicle sides, a front edge adjacent the windshield frame at the front of the vehicle, and a rear edge adjacent a rear frame at the rear of the vehicle. Similarly, the roof includes two side edges, a front edge, and a rear edge. The receptacle side edges and the roof side edges run along the vehicle's longitudinal axis. In the closed position, the roof side edges respectively meet along their length with the receptacle side edges, the roof front edge meets with the receptacle front edge, and the roof rear edge meets with the receptacle rear edge.

Each receptacle side edge includes a guide such as a guide rail. The guide rails run along the vehicle longitudinal direction. The guide rails slidably guide the roof along the vehicle's longitudinal direction when the roof is moving between the closed and opened positions. The guide rails cover guide parts engaged into them as described by EP 1 331 120 A1.

Roof pillars along the vehicle sides form the longitudinally extending receptacle side edges. The roof pillars lie above the side glass facades of the vehicle. The roof pillars are fixed to the vehicle body and form the upper boundary of the vehicle sides.

U.S. Pat. No. 3,536,354 describes an open body vehicle having a roof. A kinematic linkage moves the roof between the closed and opened positions. The roof includes a fixed rear roof cover and an adjustable front roof cover. The roof covers bridge the side roof pillars of the vehicle. The front roof cover can be adjusted through a kinematic linkage toward the vehicle rear such that the front roof cover overlays the rear roof cover when the roof is in the opened position.

DE 103 20 171 B4 (corresponding to U.S. Pat. No. 6,913, 307) describes a roof having roof covers connected to one another through kinematic linkages. The roof covers stack upon one another while maintaining their orientation during movement of the roof into the opened position. In the opened position, the roof covers can be retracted as a roof cover stack into a rear overhead storage position lying in the vehicle's floor region.

Although the kinematic linkages can achieve sufficient support for a link-guided roof in the closed position, the corresponding support stability involves a greater expense compared with guide rails for the roof. However, guides rails have a relatively high expense if they are to have rattle-free characteristics as this presumes that the guide rails have a corresponding torsion-resistant body.

SUMMARY OF THE INVENTION

An object of the present invention is to provide a locking device between a receptacle (e.g., a vehicle roof receptacle) and a movable cover (e.g., a movable vehicle roof) which fastens the roof to the receptacle at the lowest possible expense by making use of the fact that the roof fits into the receptacle with corresponding side edges.

Another object of the present invention is to provide a fastening system having a plurality of like locking devices between a roof receptacle and respective roof covers of a roof with the locking devices being actuated together to fasten the roof covers to the receptacle at the lowest possible expense by making use of the fact that the roof covers fit into the receptacle with corresponding side edges.

In carrying out the above objects and other objects, the present invention provides a locking device for locking a movable vehicle roof to a vehicle roof receptacle. The locking device includes a locking rail supported on a side of one of the roof receptacle and the roof. The locking rail is longitudinally displaceable and executes a lifting movement in response to being longitudinally displaced. A first locking element is supported on the locking rail. A second locking element is supported on a side of the other one of the roof receptacle and the roof. The first and second locking elements lock against one another in response to the lifting movement of the locking rail such that the roof receptacle and the roof are tensioned toward one another.

In carrying out the above objects and other objects, the present invention provides a vehicle roof assembly. The assembly includes a roof movable with respect to a receptacle, a locking device, and first and second locking elements. The locking device is for locking the roof to the receptacle. The locking device includes a locking rail supported on a side of one of the receptacle and the roof. The locking rail is longitudinally displaceable and executes a lifting movement in response to being longitudinally displaced. The first locking element is supported on the locking rail. The second locking element is supported on a side of the other one of the receptacle and the roof. The locking elements lock against one another in response to the lifting movement of the locking rail upon the locking rail being longitudinally adjusted in order to lock the roof to the receptacle.

In carrying out the above objects and other objects, the present invention provides another vehicle roof assembly. This assembly includes a roof movable with respect to a receptacle. The roof includes a plurality of connected roof covers. A plurality of locking devices are respectively associated with the roof covers for locking the roof covers to the receptacle. Each locking device includes a locking rail supported on a side of one of the receptacle and the respective roof cover. An actuator is coupled to the locking rails for adjusting the locking rails with translational and lifting movements. A plurality of first locking elements are respectively supported on the locking rails. A plurality of second locking elements are respectively supported on a side of the other one of the receptacle and the respective roof covers such that the first locking elements respectively correspond to the second locking elements. The corresponding first and second locking elements lock against one another in response to adjustment of the locking rails in order to lock the roof covers to the receptacle. In an embodiment of the present invention, a locking device is in the region of parallel edges of the parts (i.e., the receptacle and the cover) that are to be locked against one another and tightened. The locking device works with a locking rail. The locking rail is in the form of a locking slide. The locking rail is associated through translational and lifting movement with one of the two parts in such a way that it is possible, by adjusting the locking rail, to lock against one another corresponding locking elements on the locking rail and on the other part not associated with the locking rail.

This solution is suitable for locking vehicle roof covers to a vehicle roof receptacle in which the roof receptacle is provided by a roof cutout bordered in the vehicle's longitudinal direction by roof pillars. As such, the roof covers have edge sections common with and parallel to the roof pillars. The corresponding locking device is put between the edge sections. Each locking device allowing, if locking rails are used that extend essentially over the length of the roof cover along the vehicle's longitudinal direction, tightening and locking at a multitude of locking points. As a result, favorable stress conditions can be achieved with little expense. In addition, the use of such a locking rail also makes it simple, if the same locking devices are used for the roof cover, to connect them to one another and actuate them together.

In particular, this is possible with little expense if the locking rail is associated with the roof receptacle with the side framing for the roof cutout holding the roof cover. This framing is formed on each side by a body-side roof pillar. As such, if the roof cover(s) are tightened against the roof pillars it is also possible to achieve a load-bearing and reinforcing connection for the body when the roof is closed.

In accordance with embodiments of the present invention, it is expedient for the locking rail to have certain locking elements. Such locking elements include locking bolt receptacles such as coupling jaws (e.g., catch hooks) and the counterpart locking elements to be locking bolts arranged in the roof cover's side edge region. It is preferable for the position of the locking elements to be reciprocally coordinated with respect to one another to achieve a desired position of the cover parts. That is, of the roof cover to the roof-side cover receptacle, by making the locking bolts adjustable. It is especially expedient for this purpose for the locking bolts to be eccentric bolts, in which the bolts preferably have a head part eccentric to the load-bearing pin.

It is expedient for the locking rail to have a sliding lock guide. The slots of which run transversely inclined to the adjustment direction along the roof. As such, even if the locking rail undergoes longitudinal adjustment, the result of the locking bolt going into the respective coupling jaw is a displacement transverse to the direction of longitudinal adjustment, and thus a tightening. When used in vehicles, this tightening is against each of the side roof pillars.

As the longitudinal adjustment of the locking rail is simultaneously accompanied by transverse displacement of it, the adjustment and tensioning movement can each be achieved through an actuating drive. The actuating drive can be a linear drive that acts in the longitudinal direction of the locking rail. The actuating drive can also have a longitudinal extension corresponding to the locking rail. This produces a compact design. In connection with this, it is expedient to provide, between the actuating drive and the locking rail, a transmission arrangement. The transmission arrangement is preferably in the form of a link arrangement. The transmission/link arrangement is designed such that the respective tension position of the locking rail corresponds to a dead center position or top dead center position of the transmission arrangement. As a result, the locking and tensioning position is secure.

An embodiment according to the present invention of a locking device is expedient, especially when applied to convertible vehicles in which the roof covering is formed by a plurality of dimensionally stable roof parts and it is intended to achieve a common adjustment and locking of the roof parts to the vehicle body, despite the independent adjustability to the vehicle body achieved through kinematic linkages, in particular pivotability of the roof cover.

If roof covers are guided through kinematic linkages and at least one of the links is coupled to the roof cover in such a way that it extends at least in parts of the transitional region to the locking rail, it is also within the framework of the present invention for the roof cover-side locking element to be associated not directly with the roof cover, but rather with the region of a link lying in the transitional region to the locking rail when the roof is in closed position. This opens further design possibilities such as tightening the roof cover through the respective link of the kinematic linkage, or tightening the roof cover through the locking device, both between the roof cover as such and the locking rail, as well as between a correspondingly positioned link of the kinematic linkage, the regions of this link adjacent to the roof cover being especially suitable for this purpose.

The above features, and other features and advantages of the present invention are readily apparent from the following detailed descriptions thereof when taken in connection with the accompanying drawings.

BRIEF DESCRIPTION OF THE DRAWINGS

FIG. 4 illustrates an enlargement of the section adjacent to vehicle "B" roof pillar of the side view shown in FIG. 3.

DETAILED DESCRIPTION OF THE PREFERRED EMBODIMENT(S)

Figure 1:
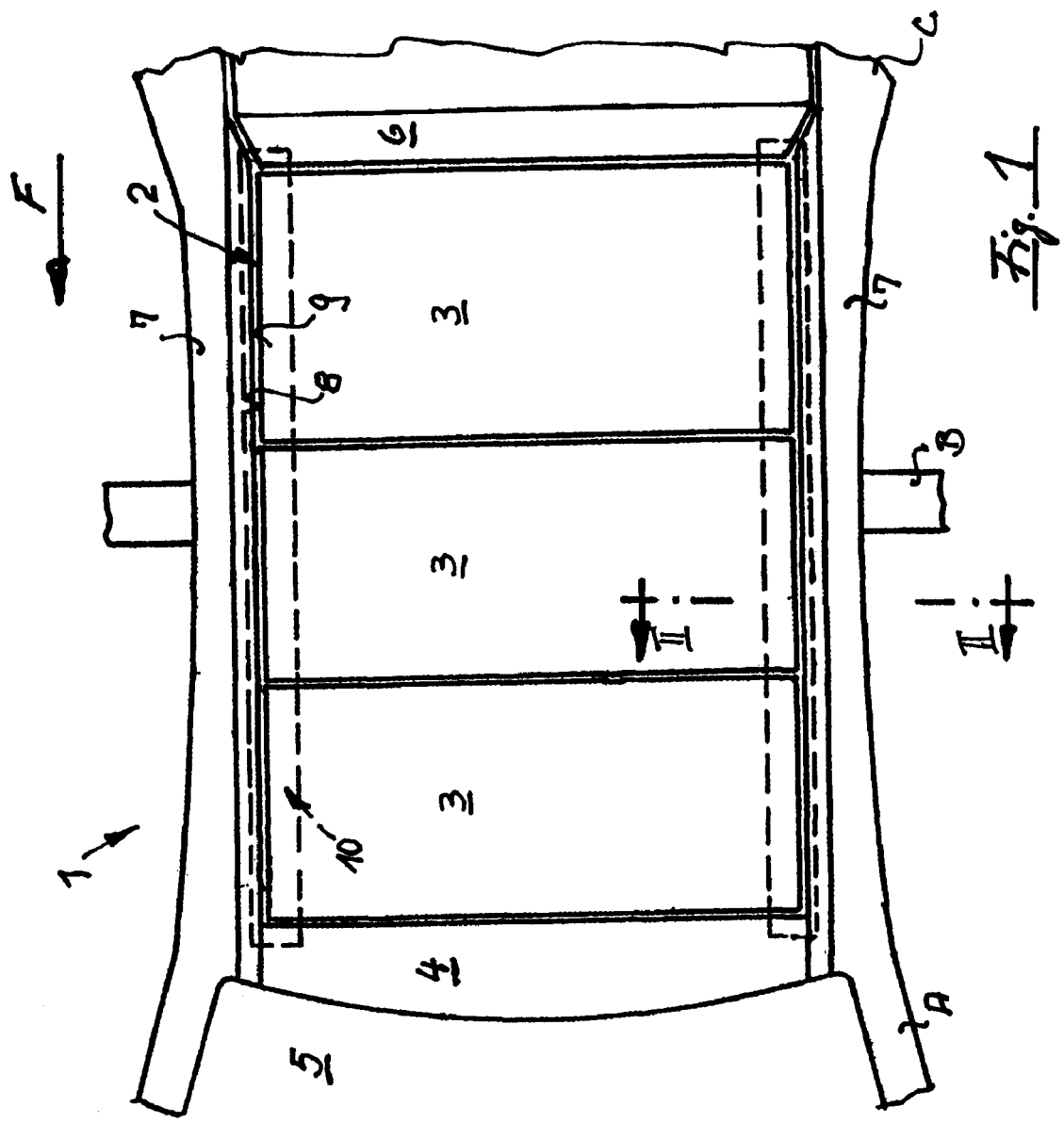
FIG. 1 illustrates a schematic top view of a convertible vehicle having a movable vehicle roof in a vehicle roof receptacle in accordance with an embodiment of the present invention.

Referring now to FIG. 1, a schematic top view of a convertible vehicle 1 in accordance with an embodiment of the present invention is shown. Vehicle 1 includes a roof cutout extending over much of the roof surface of the vehicle. The roof cutout serves as a vehicle roof receptacle 2 for a movable vehicle roof having a plurality of roof covers 3.

Roof covers 3 are connected together by a kinematic linkage system. The kinematic linkage system is operable to move the roof between a closed position in which roof covers 3 fit within receptacle 2 to thereby cover the vehicle interior and an opened position in which roof covers 3 are removed from receptacle 2 to thereby expose the vehicle interior. FIG. 1 illustrates the roof in the closed position in which roof covers 3 lie within receptacle 2 and cover the vehicle interior. Roof covers 3 move along the vehicle's longitudinal axis (i.e., in a direction parallel to direction arrow F shown in FIG. 1) when moving between the closed and opened positions. In the closed position, roof covers 3 extend sequentially behind one another in the vehicle's longitudinal direction as shown in FIG. 1.

Receptacle 2 includes a longitudinally extending side edge 9 at each of the two vehicle sides, a front edge bordered by a cowl 4 of the vehicle (cowl 4 is a transitional part to a windshield 5 at the front of the vehicle), and a rear edge which forms a rear cutout of the vehicle body. A rear cover 6 such as a rear door or a tailgate covers the rear cutout when the rear cover is in an upright and closed position. For example, in a hatchback vehicle, rear cover 6 extends substantially to the roof plane. On each side edge 9, receptacle 2 is bordered by a side roof pillar 7. Side roof pillars 7 respectively form receptacle side edges 9. The vehicle's "A", "B", and "C" pillars, for example, run up to and support both side roof pillars 7. Rear cover 6 lies between the C-pillars.

Each roof cover 3 includes two longitudinally extending side edges 8. In the closed position, roof cover side edges 8 meet along their length with respective ones of receptacle side edges 9, the front edge of the front roof cover 3 nearest the front end of the vehicle meets with the receptacle front edge, and the rear edge of the rear roof cover 3 nearest the rear end of the vehicle meets with the receptacle rear edge.

Figure 2:
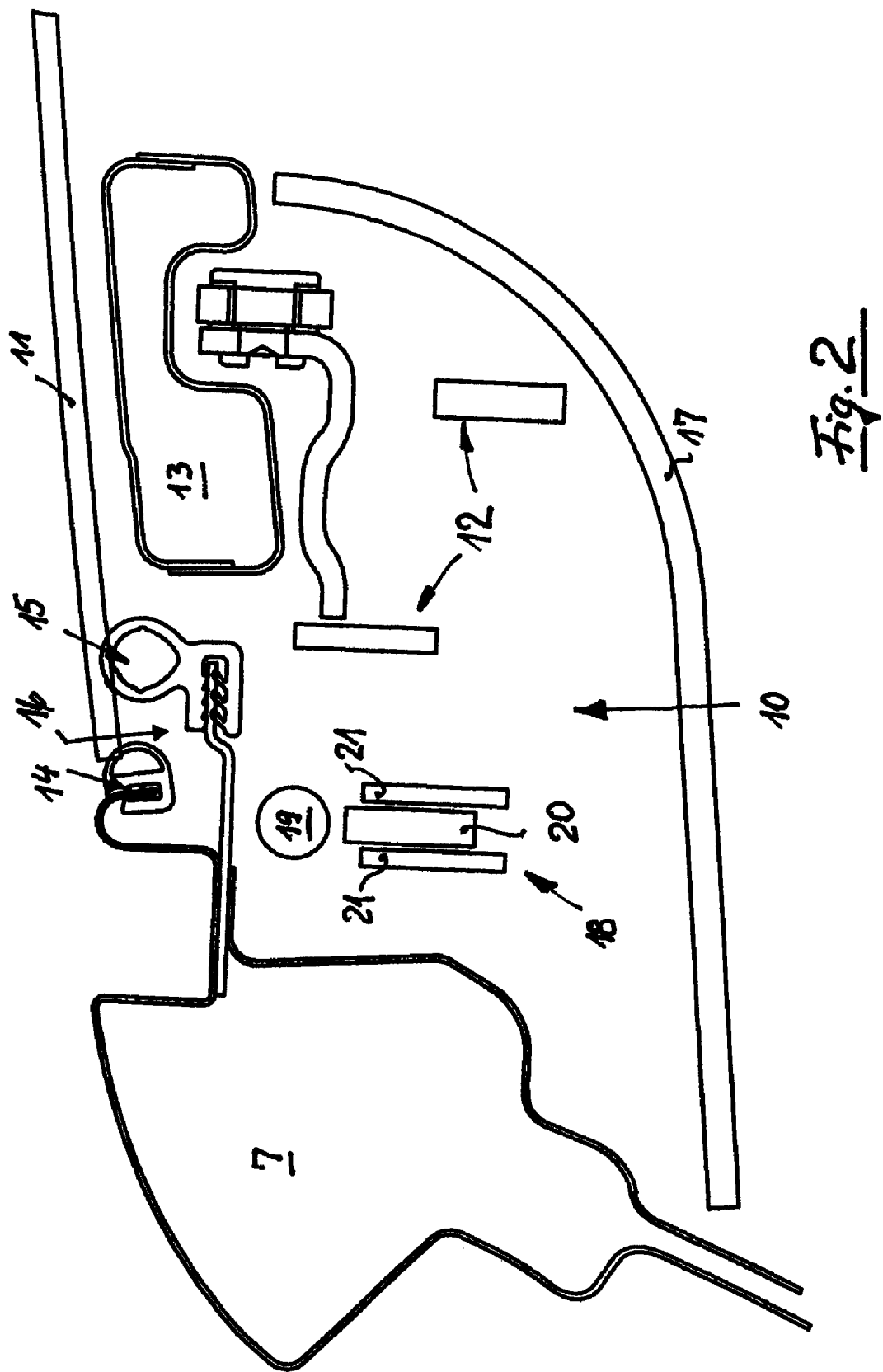
FIG. 2 illustrates a schematic sectional view along the line II-II of FIG. 1 through one of the two side roof pillars of the vehicle.

Referring now to FIG. 2, with continual reference to FIG. 1, a schematic sectional view along the line II-II of FIG. 1 through one of the two side roof pillars 7 of the vehicle is shown. FIG. 2 illustrates kinematic linkages 12 of the kinematic linkage system for moving roof covers 3 between the closed and opened positions. Kinematic linkages 12 connect roof covers 3 to one another. Roof covers 3 maintain their orientation while being moved to the opened position such that the roof covers can be put into a roof cover stack in which the roof covers overlap one another. A rotational link arrangement can move the roof cover stack into an overhead storage position in which the roof cover stack lies within the vehicle's floor region.

With reference to FIG. 1, in the closed position, roof cover side edges 8 run parallel to and respectively meet receptacle side edges 9. The dashed rectangles in FIG. 1 indicate respective transitional regions 10 between the sides of receptacle 2 and the sides of roof covers 3. Kinematic linkages 12 extend in transitional regions 10 when the roof is in the closed position. The roof cover-side coupling of respective ones of kinematic linkages 12 is made to roof frames 13 of roof covers 3. Each roof frame 13 of a roof cover 3 bears a roof covering 11. Roof coverings 11, for example, are transparent and formed of glass or plastic plates.

FIG. 2 schematically illustrates a sectional view of one of the transitional regions 10. In FIG. 2, the sealing arrangement lying in the transition of a roof covering 11 to one of side roof pillars 7 is shown. The sealing arrangement includes seals 14, 15 and a water channel 16. A panel 17 isolates transitional region 10 from the vehicle interior.

A locking device 18 is arranged in transitional region 10. Locking device 18 is intended to lock a roof cover 3 against a side roof pillar 7. Locking device 18 includes an actuating drive 19 for a locking rail 20. Locking rail 20 is longitudinally and vertically adjustable along side edges 8, 9. Locking rail 20 is connected with actuating drive 19 through a transmission arrangement. In this embodiment, the transmission arrangement is a link arrangement 21. The illustration of locking device 18 in FIG. 2 is limited to the basic elements. For clarity, FIG. 2 shows locking device 18 and kinematic linkages 12 spread out and shifted in the vehicle's transverse direction of roof pillar 7.

Figure 3:
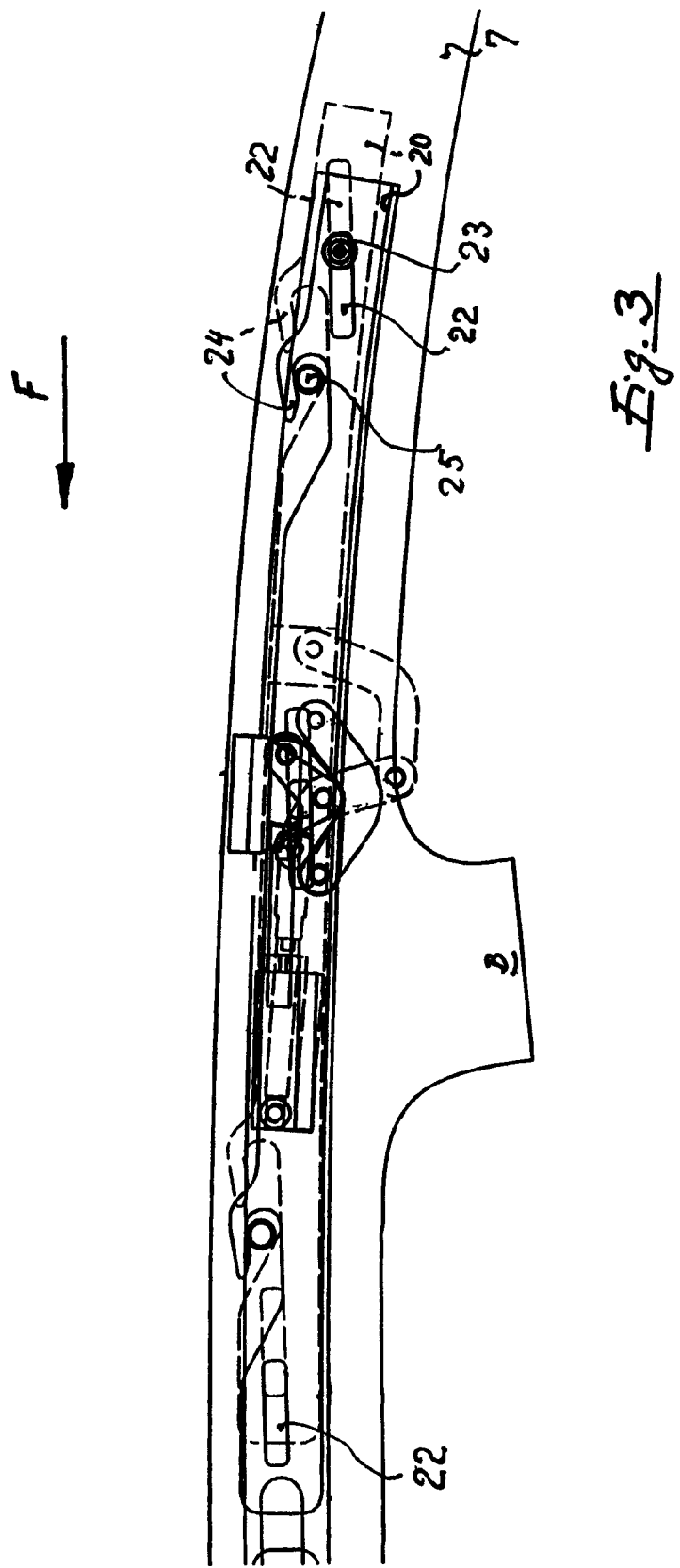
FIG. 3 illustrates a transversely oriented side view of the side roof pillar which illustrates a locking rail of a locking device arranged on the side roof pillar for locking one of the roof covers of the roof to the side roof pillar.

Referring now to FIG. 3, a transversely oriented side view through one of side roof pillars 7 is shown. FIG. 3 represents the locking device 18 in the region of middle roof cover 3 that interfaces with side roof pillar 7. Locking rail 20 associated with middle roof part 3 is guided on side roof pillar 7 so that it is longitudinally and vertically adjustable.

In the embodiment of the present invention in which the roof has a plurality of roof covers 3, analogous locking devices 18 are associated with the connected roof covers 3 and locking rails 20 associated with the respective roof covers 3 can be coupled among one another. As such, a common actuating drive 19 can lock locking rails 20, each of which is associated with one roof cover side.

The longitudinally and vertically adjustable arrangement of a locking rail 20 with respect to side roof pillar 7 is provided by a sliding lock guide on the locking rail. The sliding lock guide includes a plurality of guide slots 22. Guide slots 22 are inclined in the longitudinal direction of locking rail 20. If locking involves adjusting locking rail 20 in a direction corresponding to the direction of forward vehicle travel F, this inclination is at an angle downward toward the front. As such, the locking process displaces locking rail 20 in the direction toward the passenger compartment. Locking rail 20 corresponding to side roof pillar 7 is guided by sliding locks 23 associated with side roof pillar 7. Sliding locks 23 engage into respective ones of guide slots 22. Guide slots 22 lie in the region of locking elements through which locking rail 20 should be tightened against the respective roof cover 3. Locking rail 20 provides such locking elements.

In this embodiment, the locking elements include catch hooks 24 and locking bolts 25. Catch hooks 24 open in the actuation direction of locking rail 20 when roof cover 3 is locked. Locking bolts 25 project out of the side of roof cover 3 in the direction toward side roof pillar 7. Each catch hook 24 is associated with a locking bolt 25.

The dashed lines in FIGS. 3 and 4 show locking rail 20 in its position releasing the respective roof cover 3. The solid lines in FIGS. 3 and 4 show the locking rail in its locking position in which locking bolt 25 of roof cover 3 is held by a respective catch hook 24. Due to the vertical adjustment of locking rail 20 accompanying the longitudinal displacement of locking rail 20, locking bolt 25 is tensioned in the direction toward the vehicle interior in such a way that the respective roof covering 11 comes to lie against the roof pillar-side seals 14 and 15, forming a seal.

In this embodiment, actuating drive 19 includes a linear drive supported against side roof pillar 7. The linear drive is in the form of an actuating cylinder 26. Actuating cylinder 26 is fastened to side roof pillar 7 through a fastening bolt 27 in such a way that it can pivot. Actuating cylinder 26 acts on a turning link 28. Turning link 28 is in the form of a two-arm elbow lever. Turning link 28 has, in the region of its vertex, a mount 29 to a fastening bracket 30 of side roof pillar 7. A first arm 31 of turning link 28 pivots on actuating cylinder 26 at 32. A second arm 33 of turning link 28 pivots on an actuation link 34 at 35. The end of actuation link 34 remote from pivot 35 is connected through a pivot 36 with locking rail 20. The angular shape of actuation link 34 is adapted to that of turning link 28. This makes it possible to achieve an extended type of construction. However, in particular, it also secures the locking position by a top dead center position, as is illustrated by the position of pivots 35 and 36 to mount 29 in FIG. 4.

This embodiment makes it simple to adjust roof covers 3 in their position to one another tensioned through locking device 18, by designing the locking bolts 25 as eccentric bolts.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A locking device for locking a roof to a receptacle of a vehicle in which the vehicle has a front end, a rear end opposite the front end, a first side, and a second side opposite the first side, and in which a longitudinal axis extends between the front and rear vehicle ends and a transverse axis extends between the first and second vehicle sides, the roof and the receptacle each has a corresponding side extending along the longitudinal axis on the first side of the vehicle, the receptacle has a peg extending along the transverse axis from the side of the receptacle toward the side of the roof, and the roof is movable along the longitudinal axis between a closed position in which the roof lies within the receptacle substantially along a roof plane containing the longitudinal and transverse axes and an opened position in which the roof is removed from the receptacle, the locking device comprising:

a locking rail extending along the longitudinal axis and supported on the side of the receptacle between the sides of the roof and the receptacle such that the locking rail is movable along the longitudinal axis and is movable vertically relative to the roof plane, the locking rail having a guide slot which is vertically inclined relative to the roof plane in a direction from the front end of the vehicle to the rear end of the vehicle along the longitudinal axis such that a front end of the guide slot which is closer to the front end of the vehicle is vertically lower than a back end of the guide slot which is closer to the rear end of the vehicle;

wherein the guide slot receives the peg of the receptacle such that the locking rail is movable along the longitudinal axis and is movable vertically relative to the roof plane between an unlocked position in which the locking rail is moved along the longitudinal axis towards the rear end of the vehicle and is moved vertically upward relative to the roof plane with the peg engaging the front end of the guide slot and a locked position in which the locking rail is moved along the longitudinal axis towards the front end of the vehicle and is moved vertically downward relative to the roof plane with the peg engaging the back end of the guide slot;

a locking element receptacle supported on the locking rail and opened toward the front end of the vehicle; and a locking element supported on the side of the roof and extending along the transverse axis from the side of the roof toward the side of the receptacle, wherein when the roof is in the closed position the locking element receptacle engages the locking element to lock the roof to the receptacle in response to the locking rail being moved to the locked position with the locking element and thereby the roof being tensioned vertically downward as a result of the vertical downward movement of the locking rail, wherein the locking bolt receptacle disengages from the locking element to unlock the roof from the receptacle in response to the locking rail being moved to the unlocked position.

2. The locking device of claim 1 wherein:

the locking element receptacle includes a locking bolt receptacle and the locking element includes a locking body.

3. The locking device of claim 2 wherein:

the locking bolt receptacle is a catch hook.

4. The locking device of claim 3 wherein:

the locking body is a locking bolt.

* * * * *